Patented Feb. 5, 1946

2,394,315

UNITED STATES PATENT OFFICE 2,394,315

PRODUCTION OF NITRO-PARAFFINS

Norman Levy, Norton-on-Tees, England, assignor to Imperial Chemical Industries Limited, a corporation of Great Britain No Drawing. Application February 13, 1942, Serial No. 430,740. In Great Britain August 16, 1940

3 Claims. (Cl. 260—644)

This invention relates to the production of nitro-paraffins from nitric acid and paraffins.

It is known that nitro-paraffins can be produced by heating paraffins with nitric acid in the gaseous phase. In this known process, however, although the rate of nitration is large, the rate of oxidation is also very considerable, and in fact to avoid the latter becoming excessive and the risk of explosion, it is not practicable to employ a volume ratio of paraffin to nitric acid of less than 2:1. In consequence, the conversion of hydrocarbon to nitro-paraffin per passage through the reaction space is low.

I have now found that this process is improved by carrying it out in the presence of a silicate glass containing arsenic and/or antimony. These glasses accelerate the nitration and at the same time hinder the oxidation of the paraffins.

According to the present invention therefore, nitroparaffins are prepared by heating one or more paraffins and nitric acid in the gaseous phase in the presence of a catalyst comprising a silicate glass which contains arsenic and/or antimony, the said catalyst presenting a large surface area per unit volume of catalyst space.

The presentation by the catalyst of a large surface area per unit volume of catalyst space may be obtained for example by packing regular or irregular fragments of the catalytic material into a suitable container or by filling a suitable container with catalyst in the form of capillary tubing.

The paraffins to be treated by the process of this invention may contain other gases such as hydrogen, olefine hydrocarbons, and nitrogen, but it is preferable that they should be absent or low in concentration. Hydrogen tends to increase the rate of oxidation of the paraffins, while olefines consume nitric acid and tend to make the reaction more sensitive to explosion. Inert gases such as nitrogen tend to counteract the good effect of the silicate glass by hindering the contact of the reactants with the glass.

Ordinary "commercial" concentrated nitric acid containing about 68 per cent by weight of the pure acid is suitable, but weaker or stronger acid may be used. The acid may be introduced into the reaction space in any convenient manner, for example, it may be fed in in the liquid form and vaporised in the reaction space, or it may be vaporised before introduction into the reaction space, or it may be introduced together with the paraffins by bubbling the latter through a bath of the acid at a temperature chosen so that the gases take up the required amount of the acid in the form of vapour.

It is preferable to heat the reactants to above 300° C. although lower temperatures may be used. A temperature of about 450° C. should, however, in general not be exceeded, otherwise oxidation of the paraffins is liable to become excessive.

The reaction may be carried out under atmospheric or higher pressures. In the case of methane, for example, increased pressure is advantageous, since little or no nitration occurs at atmospheric pressure.

A particularly advantageous feature of this invention resides in the fact that the volume ratio of paraffins to nitric acid may be as low as half, without excessive oxidation or risk of explosion, and with a consequent increase in the percentage conversion of hydrocarbon to nitroparaffins per passage through the reaction space.

A time of contact between the reactants in the reaction space of 1–5 seconds is, in general, satisfactory. Increase in the time of contact tends to increase the rate of oxidation relative to nitration.

The exit gases from the reaction space contain oxides of nitrogen and unreacted paraffins and, after separation from them of the nitroparaffins and any oxidation products, for example, by cooling down to condense out the former and scrubbing with known absorbent liquids to remove the latter, may be returned to the reaction space.

Example

Propane was passed at a rate of 23 litres per hour through a heated chamber into which there dripped at a rate of 32 mls. per hour, nitric acid containing 70% by weight of the pure acid, the chamber being maintained at a temperature sufficiently high to vaporise the nitric acid. The mixture of propane and nitric acid vapour then passed to a catalyst chamber which was packed with fragments of a borosilicate glass containing 0.23% of arsenic, the catalyst being maintained at a temperature of 390° C. The vapours leaving the catalyst chamber were cooled whereby a liquid product which separated into two layers was obtained, one layer being impure nitroparaffin and the other an aqueous liquor containing chiefly nitric acid. The whole of the liquid was distilled whereby a nitroparaffin layer in contact with a layer of substantially pure water was obtained. The aqueous layer was removed from the nitroparaffin layer, which, after drying over calcium chloride was found to contain chiefly 2-nitropropane together with smaller quantities of 1-nitropropane, nitroethane and nitromethane. Of the propane passed through the apparatus, 13% appeared in the product as nitroparaffins, the quantity of which represented 76% of the total propane consumed.

I claim:

1. A method of producing nitroparaffins which comprises reacting in vapor phase nitric acid and at least one paraffin by mixing vaporized nitric acid with said paraffin and passing the mixed gases through a heated catalyst chamber packed with fragments of a catalyst selected from the group consisting of the compounds of arsenic and antimony and cooling the issuing gases to condense the nitroparaffins therefrom.

2. The method of claim 1 wherein the catalyst comprises fragments of a glass containing a compound selected from the group consisting of the compounds of arsenic and antimony.

3. The method of claim 1 wherein the catalyst is maintained at a temperature between 300 and 450° C.

NORMAN LEVY.